(12) United States Patent
Sugiura

(10) Patent No.: US 9,007,233 B2
(45) Date of Patent: Apr. 14, 2015

(54) NON-CONTACT CAPACITIVE DATALINK FOR A DOWNHOLE ASSEMBLY

(75) Inventor: Junichi Sugiura, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 673 days.

(21) Appl. No.: 13/333,664

(22) Filed: Dec. 21, 2011

(65) Prior Publication Data

US 2012/0090827 A1    Apr. 19, 2012

Related U.S. Application Data

(62) Division of application No. 11/897,597, filed on Aug. 31, 2007, now Pat. No. 8,102,276.

(51) Int. Cl.
*G01V 3/00* (2006.01)
*G01V 11/00* (2006.01)
*E21B 17/02* (2006.01)

(52) U.S. Cl.
CPC ............ *G01V 11/002* (2013.01); *E21B 17/028* (2013.01)

(58) Field of Classification Search
CPC ............................. E21B 17/028; G01V 11/002
USPC .......... 340/854.8, 665, 870.37; 166/65.1, 380
See application file for complete search history.

(56) References Cited

U.S. PATENT DOCUMENTS

| | | |
|---|---|---|
| 3,780,593 A | 12/1973 | Coleman et al. |
| 5,375,098 A | 12/1994 | Malone et al. |
| 5,603,386 A | 2/1997 | Webster |
| 5,955,809 A | 9/1999 | Shah |
| 6,087,750 A | 7/2000 | Raad |
| 6,118,283 A | 9/2000 | Cripe |
| 6,191,561 B1 | 2/2001 | Bartel |
| 6,427,783 B2 | 8/2002 | Krueger et al. |
| 6,492,911 B1 | 12/2002 | Netzer |
| 6,540,032 B1 | 4/2003 | Krueger |
| 6,609,579 B2 | 8/2003 | Krueger et al. |
| 6,756,719 B1 | 6/2004 | Chiu |
| 6,761,232 B2 | 7/2004 | Moody et al. |
| 6,857,484 B1 | 2/2005 | Helms et al. |
| 6,864,759 B2 | 3/2005 | Lonsdale et al. |
| 7,025,130 B2 | 4/2006 | Bailey et al. |
| RE39,259 E | 9/2006 | Mills et al. |
| 7,116,199 B2 | 10/2006 | Hall et al. |
| 7,168,510 B2 | 1/2007 | Boyle et al. |
| 7,190,280 B2 | 3/2007 | Hall et al. |
| 7,222,681 B2 | 5/2007 | Jones et al. |
| 7,576,543 B2 | 8/2009 | Ritter et al. |
| 8,102,276 B2 * | 1/2012 | Sugiura ...................... 340/854.8 |

(Continued)

*Primary Examiner* — Albert Wong
(74) *Attorney, Agent, or Firm* — Christopher Streinz; Kimberly Ballew

(57) ABSTRACT

Aspects of this invention include a downhole assembly having a non-contact, capacitive coupling including first and second transceivers deployed in corresponding first and second downhole tool members. The capacitive coupling is disposed to transfer electrical signals between the first and second transceivers. In one exemplary embodiment, the capacitive coupling is configured to transfer data and power between a substantially non-rotating tool member and a rotating tool member, for example, the shaft and blade housing in a steering tool. Exemplary embodiments of this invention provide a non-contact, high-speed data communication channel between first and second members of a downhole assembly. Moreover, exemplary embodiments of the invention also provide for simultaneous non-contact transmission of electrical power between the first and second tool members.

12 Claims, 5 Drawing Sheets

(56) References Cited

U.S. PATENT DOCUMENTS

| | | |
|---|---|---|
| 2001/0030544 A1 | 10/2001 | Wilson et al. |
| 2003/0174062 A1 | 9/2003 | Lonsdale et al. |
| 2004/0163822 A1 | 8/2004 | Zhang et al. |
| 2005/0230098 A1 | 10/2005 | Sand et al. |
| 2005/0269082 A1 | 12/2005 | Baron et al. |
| 2005/0285706 A1 | 12/2005 | Hall et al. |
| 2006/0124354 A1 | 6/2006 | Witte |
| 2007/0079989 A1 | 4/2007 | Bankston et al. |
| 2007/0137853 A1 | 6/2007 | Zhang et al. |

* cited by examiner

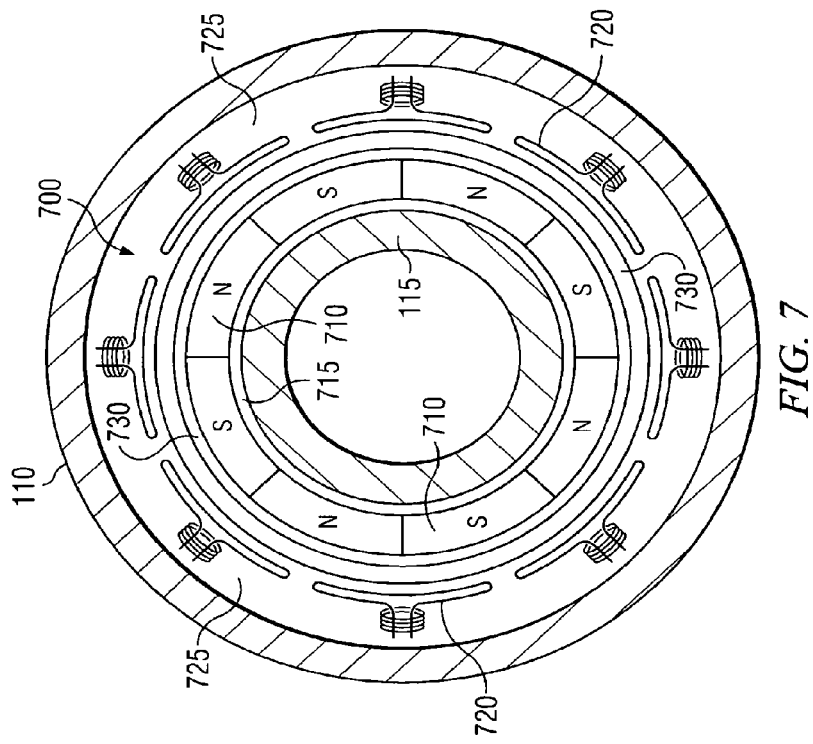
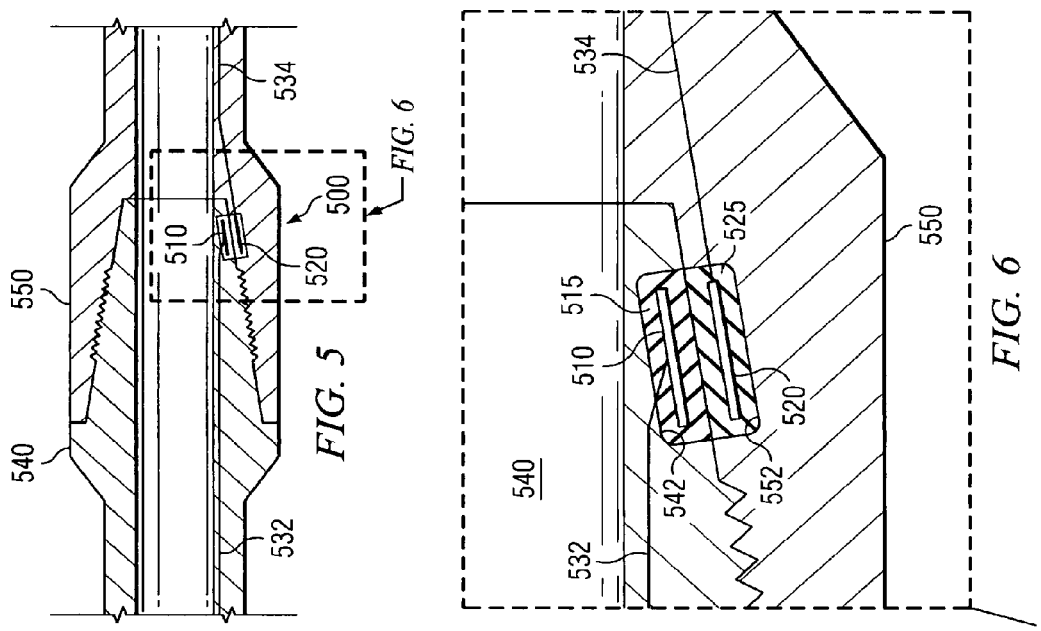

NON-CONTACT CAPACITIVE DATALINK FOR A DOWNHOLE ASSEMBLY

RELATED APPLICATIONS

This application is a divisional of U.S. patent application Ser. No. 11/897,597, filed Aug. 31, 2007, entitled "NON-CONTACT CAPACITIVE DATALINK FOR A DOWNHOLE ASSEMBLY."

FIELD OF THE INVENTION

The present invention relates generally to downhole tools, for example, including directional drilling tools such as a steering tool and a mud motor. More particularly, embodiments of this invention relate to a downhole assembly including a non-contact, capacitive coupling apparatus for transmitting electrical power and/or data between first and second members of the assembly.

BACKGROUND OF THE INVENTION

As is well-known in the industry, hydrocarbons are recovered from subterranean reservoirs by drilling a borehole (wellbore) into the reservoir. Such boreholes are commonly drilled using a rotating drill bit attached to the bottom of a drilling assembly (which is commonly referred to in the art as a bottom hole assembly or a BHA). The drilling assembly is commonly connected to the lower end of a drill string including a long string of sections (joints) of drill pipe that are connected end-to-end via threaded pipe connections. The drill bit, deployed at the lower end of the BHA, is rotated by rotating the drill string from the surface and/or by a mud motor deployed in the BHA. Mud motors are also commonly utilized with flexible, spoolable tubing commonly referred to in the art as coiled tubing. During drilling a drilling fluid (referred to in the art as mud) is pumped downward through the drill string (or coiled tubing) to provide lubrication and cooling of the drill bit. The drilling fluid exits the drilling assembly through ports located in the drill bit and travels upward, carrying debris and cuttings, through the annular region between the drilling assembly and borehole wall.

In recent years, directional control of the borehole has become increasingly important in the drilling of subterranean oil and gas wells, with a significant proportion of current drilling activity involving the drilling of deviated boreholes. Such deviated boreholes often have complex profiles, including multiple doglegs and a horizontal section that may be guided through thin, fault bearing strata, and are typically utilized to more fully exploit hydrocarbon reservoirs. Deviated boreholes are often drilled using downhole steering tools, such as two-dimensional and three-dimensional rotary steerable tools. Such tools commonly include a plurality of independently operable blades (or force application members) that are disposed to extend radially outward from a tool housing into contact with the borehole wall. The direction of drilling may be controlled by controlling the magnitude and direction of the force or the magnitude and direction of the displacement applied to the borehole wall. In rotary steerable tools, the housing is typically deployed about a rotatable shaft, which is coupled to the drill string and disposed to transfer weight and torque from the surface (or from a mud motor) through the steering tool to the drill bit assembly.

Directional wells are also commonly drilled by causing a mud motor power section to rotate the drill bit through a displaced axis while the drill string remains stationary (non-rotating). The displaced axis may be achieved, for example, via a bent sub deployed above the mud motor or alternatively via a mud motor having a bent outer housing. The bent sub or bent motor housing cause the direction of drilling to deviate (turn), resulting in a well section having a predetermined curvature (dogleg severity) in the direction of the bend. A drive shaft assembly deployed below the power section transmits downward force and power (rotary torque) from the drill string and power section through a bearing assembly to the drill bit. Common drive shaft assemblies include a rotatable shaft (mandrel) deployed in a housing.

The non-rotating sections (e.g., the above described housings) commonly include MWD and/or LWD sensors, electronic components and controllers, and electrical actuators (e.g., solenoids used to control steering blades). In the above described drilling assemblies a gap typically exists between the rotating and non-rotating sections (e.g., between the shaft and housing). Thus electrical power must be stored and/or generated in the non-rotating section or transferred across the gap from the rotating section to the non-rotating section. Moreover, in order to provide electronic communication between the rotating and non-rotating sections, data must also be transferred back and forth across the gap.

Techniques for transmitting electrical power and electronic data across the gap between rotating and non-rotating tool sections are known in the art. For example, sealed slip rings are conventionally utilized. While slip rings are known to be commercially serviceable, failure of certain slip ring components is a known cause of downhole tool failure. For example, slip ring seals have been known to fail, which can result in a loss of communication with the tool and the need to trip out of the borehole. Loss of electrical contact between the slip ring contact members is also a known cause of tool failure.

Inductive coupling devices are also known for transferring power and/or data between rotating and non rotating tool sections. For example, U.S. Pat. No. 6,540,032 to Krueger discloses an inductive coupling for transferring power and data between rotating and non-rotating sections of a downhole drilling assembly. While inductive coupling devices are known in commercial oilfield applications, there remains a need for improved devices for non-contact transmission of data and electrical power between tool sections. For example, inductive couplings tend to occupy a large physical space and are typically expensive to fabricate (due to the use of a wound magnetic core). Inductive couplings also tend to exhibit low transmission efficiencies owing to the relatively large gap between transmitter and receiver. Owing to the demand for smaller diameter and less expensive rotary steerable tools (and downhole tools in general), there is a need for improved non-contact power and data transmission devices.

SUMMARY OF THE INVENTION

The present invention addresses the need for improved non-contact power and data transmission devices in downhole tools including downhole drilling assemblies. Aspects of this invention include a downhole assembly having a non-contact, capacitive coupling including first and second transceivers deployed in corresponding first and second downhole tool members. The capacitive coupling is disposed to transfer electrical signals between the first and second transceivers. In one exemplary embodiment, the capacitive coupling is configured to transfer data and power between a substantially non-rotating tool member and a rotating tool member, for example, the shaft and blade housing in a steering tool. In another exemplary embodiment, the capacitive coupling is disposed to transfer data signals through a threaded pipe connection. Aspects of the invention typically further include electronic control circuitry for transmitting and receiving the electric signals.

Exemplary embodiments of the present invention may advantageously provide several technical advantages. For example, exemplary embodiments of this invention provide a non-contact, high-speed data communication channel between first and second members of a downhole assembly. Moreover, exemplary embodiments of the invention also provide for simultaneous non-contact transmission of electrical power between the first and second tool members. Exemplary embodiments of the invention also tend to be relatively simple and inexpensive to manufacture as compared to inductive couplings of the prior art. Exemplary capacitive coupling embodiments also tend to advantageously be low mass and more resistant to shock and vibration than prior art slip ring and inductive coupling devices. In one exemplary embodiment, a capacitive coupling device in accordance with the invention may be advantageously configured to transmit high-speed data signals through an electrical generator (alternator).

In one aspect the present invention includes a downhole assembly. The downhole assembly includes first and second downhole members and a non-contact, capacitive coupling device. The capacitive coupling device includes first and second capacitively coupled transceivers and a dielectric gap therebetween. The first transceiver is deployed in the first member and the second transceiver is deployed in the second member. The first and second transceivers are disposed to transfer an electrical signal between the first and second members. In one exemplary embodiment, the first member is a shaft and the second member is a tool housing in which the shaft is deployed to rotate.

In another aspect this invention includes a downhole drilling assembly. The drilling assembly includes a shaft disposed to rotate in a tool housing. A magnetic ring is deployed about the shaft and includes a plurality of circumferentially alternating magnets. An armature is deployed in the housing substantially coaxially about the magnetic ring. The armature includes a plurality of radial windings such that rotation of the shaft in the housing produces AC electrical power. The assembly further includes a non-contact capacitive coupling device having first and second capacitively coupled transceivers with a dielectric gap therebetween. The first transceiver is deployed in the shaft and the second transceiver is deployed in the tool housing. The capacitive coupling device is disposed to transfer an electrical signal between the shaft and the tool housing.

In another aspect the present invention includes a threaded downhole connector. The connector includes a first threaded member disposed to be threadably connected with a second threaded member and a non-contact, capacitive coupling device including first and second capacitively coupled transceivers with a dielectric gap therebetween. The first transceiver is deployed in the first threaded member and the second transceiver is deployed in the second threaded member. The capacitive coupling device is disposed to transfer an electrical signal between the first and second threaded members.

The foregoing has outlined rather broadly the features of the present invention in order that the detailed description of the invention that follows may be better understood. Additional features and advantages of the invention will be described hereinafter which form the subject of the claims of the invention. It should be appreciated by those skilled in the art that the conception and the specific embodiments disclosed may be readily utilized as a basis for modifying or designing other methods, structures, and encoding schemes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which:

FIGS. 5 and 6 depict an alternative embodiment of a non-contact, capacitive coupling device in accordance with the invention deployed in a downhole threaded pipe connection.

FIG. 7 depicts a transverse cross section of a shaft driven downhole alternator including a non-contact capacitive coupling device in accordance with the invention.

DETAILED DESCRIPTION

Figure 1:
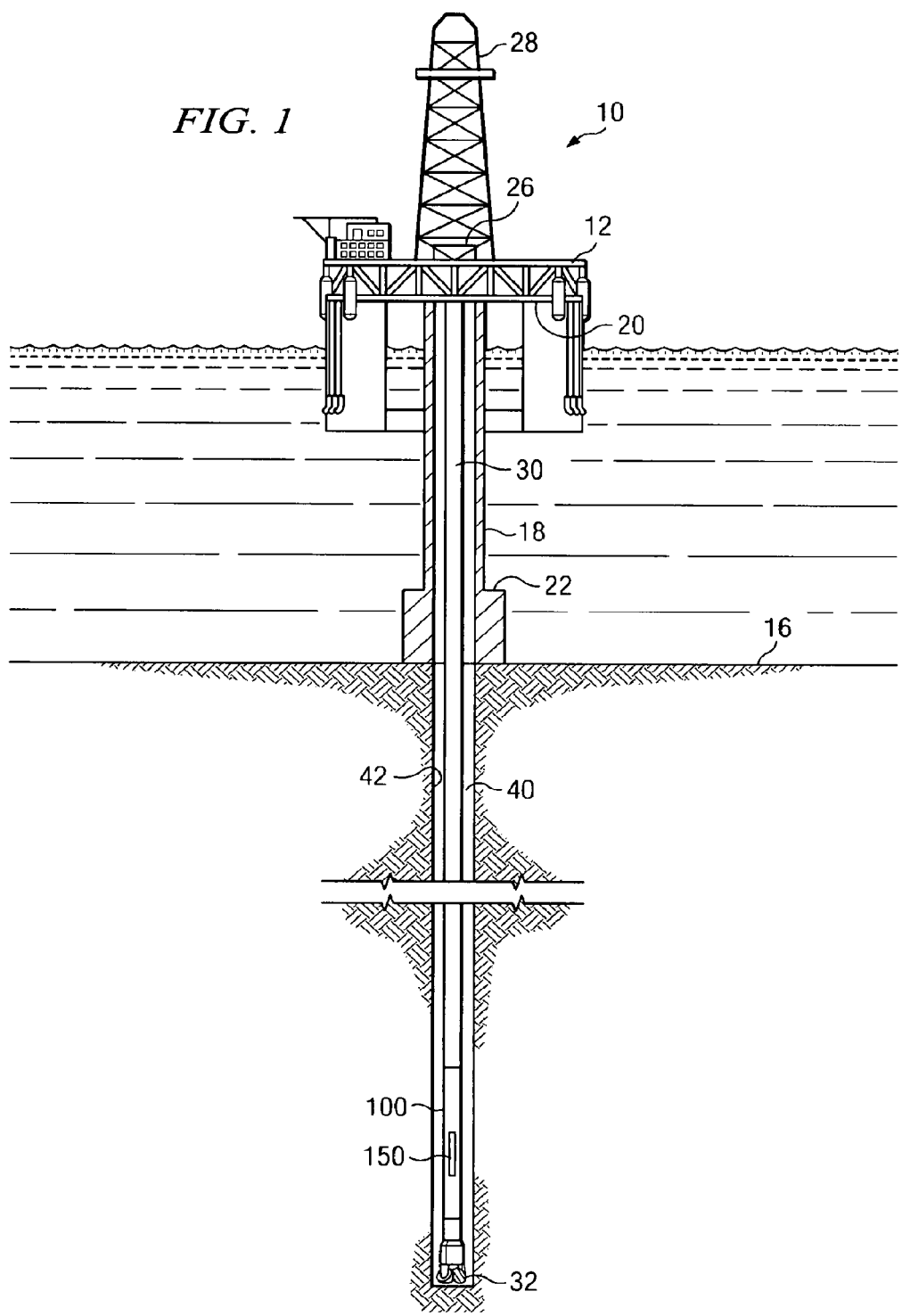
FIG. 1 depicts a drilling rig on which exemplary embodiments of the present invention may be deployed.

Referring first to FIGS. 1 through 7, it will be understood that features or aspects of the embodiments illustrated may be shown from various views. Where such features or aspects are common to particular views, they are labeled using the same reference numeral. Thus, a feature or aspect labeled with a particular reference numeral on one view in FIGS. 1 through 7 may be described herein with respect to that reference numeral shown on other views.

FIG. 1 illustrates a drilling rig 10 suitable for utilizing exemplary downhole drilling assembly (including steering tool and mud motor) and method embodiments of the present invention. In the exemplary embodiment shown on FIG. 1, a semisubmersible drilling platform 12 is positioned over an oil or gas formation (not shown) disposed below the sea floor 16. A subsea conduit 18 extends from deck 20 of platform 12 to a wellhead installation 22. The platform may include a derrick 26 and a hoisting apparatus 28 for raising and lowering the drill string 30, which, as shown, extends into borehole 40 and includes a drill bit 32 and a steering tool 100 (such as a three-dimensional rotary steerable tool). In the exemplary embodiment shown, steering tool 100 includes a plurality of blades 150 (e.g., three) disposed to extend outward from the tool 100. The extension of the blades 150 into contact with the borehole wall is intended to eccenter the tool in the borehole, thereby changing an angle of approach of the drill bit 32 (which changes the direction of drilling). Exemplary embodiments of steering tool 100 further include hydraulic 130 and electronic 140 control modules (FIG. 2) configured to control extension and retraction of the blades 150. It will be appreciate that control modules 130 and 140 typically include various electrical power consuming devices, such as, but not limited to, solenoid controllable valves, sensors (e.g., including accelerometers, pressure transducers, temperature sensors, rotation rate sensors, and the like), and other electronic components (e.g., including microprocessors, electronic memory, timers, and the like). The drill string 30 may also include various electronic devices, e.g., including a telemetry system, additional sensors for sensing downhole characteristics of the borehole and the surrounding formation, and microcontrollers disposed to be in electronic communication with electronic control module 140. The invention is not limited in regards to specific types or makes of electrical and/or electronic devices.

It will be understood by those of ordinary skill in the art that methods and apparatuses in accordance with this invention are not limited to use with a semisubmersible platform 12 as illustrated in FIG. 1. This invention is equally well suited for use with any kind of subterranean drilling operation, either offshore or onshore. While exemplary embodiments of this invention are described below with respect to rotary steerable embodiments. It will be appreciated that the invention is not limited in this regard. For example, as described in more detail below, embodiments of the invention may also be utilized with mud motors (e.g., deployed below the power section). Moreover, it will also be appreciated that the invention is not limited to downhole tool assemblies employing rotating and non rotating sections. For example, as described in more detail below with respect to FIGS. 5 and 6, exemplary embodiments of the invention may be utilized to provide a non-contact datalink between substantially fixed downhole members.

Figure 2:
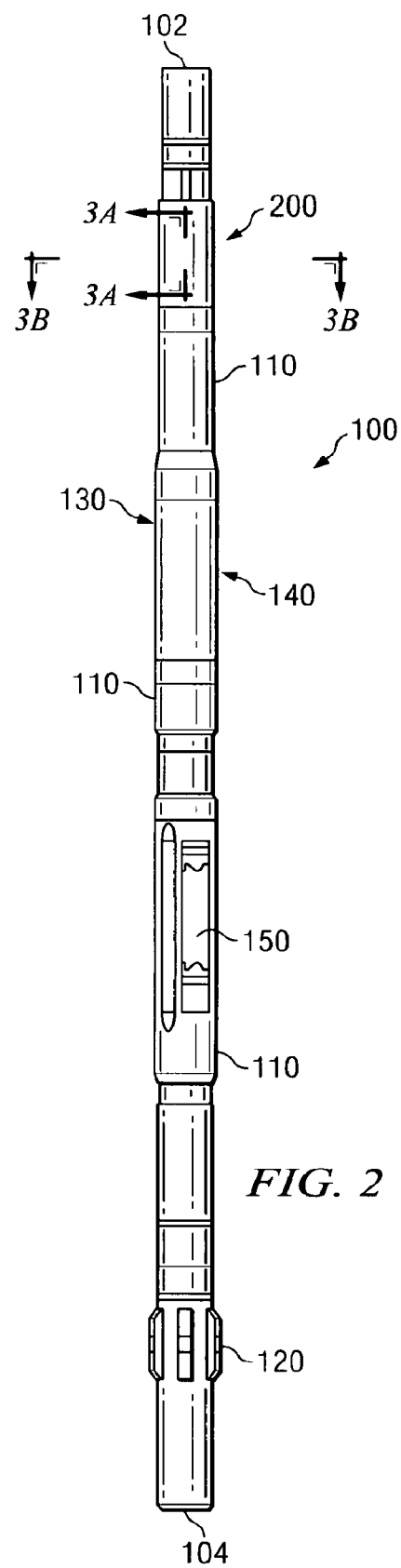
FIG. 2 is a perspective view of one exemplary embodiment of the steering tool shown on FIG. 1.

Turning now to FIG. 2, one exemplary embodiment of steering tool 100 from FIG. 1 is illustrated in perspective view. In the exemplary embodiment shown, steering tool 100 is substantially cylindrical and includes threaded ends 102 and 104 (threads not shown) for connecting with other bottom hole assembly (BHA) components (e.g., connecting with the drill bit at end 104 and upper BHA components at end 102). The steering tool 100 further includes a housing 110 and at least one blade 150 deployed, for example, in a recess (not shown) in the housing 110. Control modules 130 and 140 are deployed in the housing 110. In general, the control modules 130 and 140 are configured for measuring and controlling the direction of drilling. Control modules 130 and 140 may include substantially any devices known to those of skill in the art, such as those disclosed in U.S. Pat. No. 5,603,386 to Webster or U.S. Pat. No. 6,427,783 to Krueger et al.

Figure 3A:
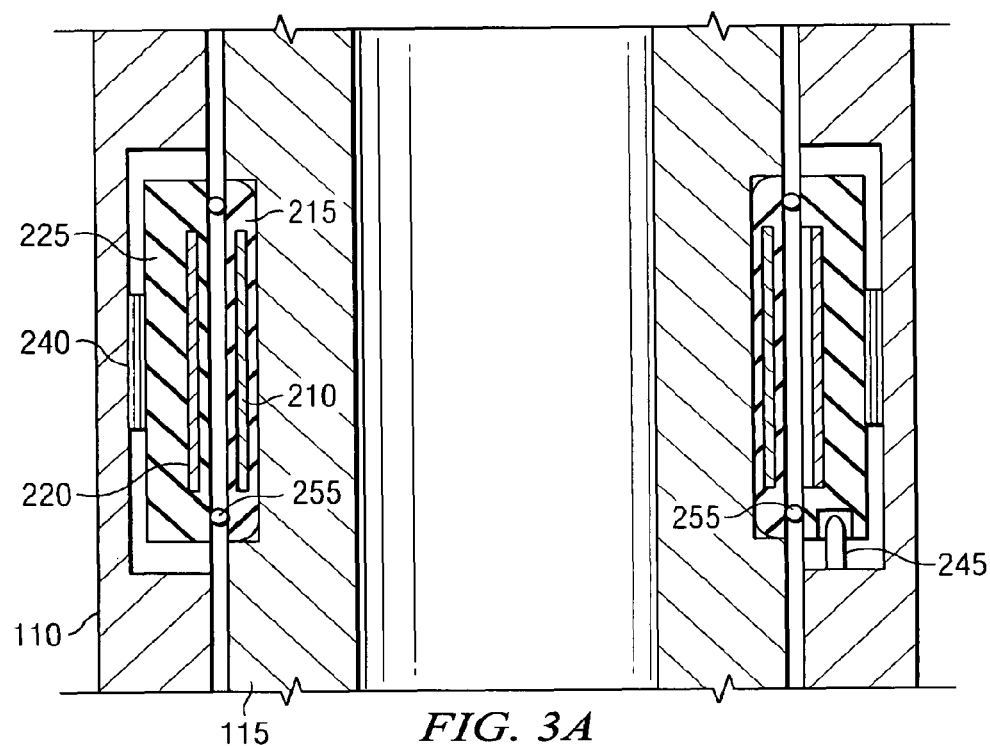
FIGS. 3A and 3B depict longitudinal and transverse cross sections of an exemplary non-contact, capacitive coupling device in accordance with the present invention deployed in the steering tool shown on FIG. 2.
Figure 3B:
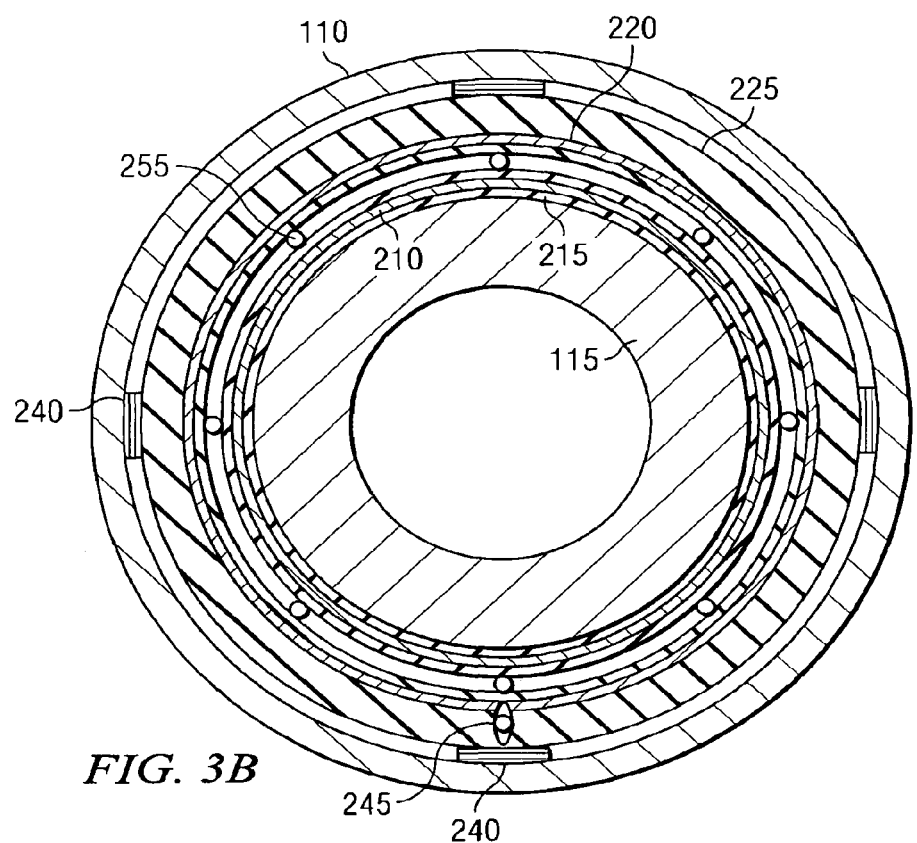

To steer (i.e., change the direction of drilling), one or more of blades 150 are extended into contact with the borehole wall. The steering tool 100 is moved away from the center of the borehole by this operation, thereby altering the drilling path. It will be appreciated that the tool 100 may also be moved back towards the borehole axis if it is already eccentered. To facilitate controlled steering, the rotation rate of the housing is desirably less than 0.1 rpm during drilling, although the invention is not limited in this regard. By keeping the blades 150 in a substantially fixed position with respect to the circumference of the borehole (i.e., by preventing rotation of the housing 110), it is possible to steer the tool without constantly extending and retracting the blades 150. Non-rotary steerable embodiments are thus typically only utilized in sliding mode. In rotary steerable embodiments, the tool 100 is constructed so that the housing 110, which houses the blades 150, remains stationary, or substantially stationary, with respect to the borehole during directional drilling operations. The housing 110 is therefore constructed in a rotationally non-fixed (or floating) fashion with respect to a shaft 115 (FIGS. 3A and 3B). The shaft 115 is connected with the drill string and is disposed to transfer both torque (rotary power) and weight to the bit. As described above, the invention is not limited to rotary steerable embodiments, nor even to embodiments having tool sections that rotate relative to one another.

The above described extension and/or retraction of the blades 150 is known to consume electrical power. For example, in one commercially serviceable embodiment, the blades 150 are extended via hydraulic actuation with solenoid controllable valves being utilized to control hydraulic fluid pressure at the individual blades. Electrically powered hydraulic pumps have also been disclosed for controlling blade actuation (U.S. Pat. No. 6,609,579). Steering tool 100 typically further includes electronics for sensing and controlling the position of each of the blades. Such electronics typically consume relatively little electrical power as compared to the solenoids and/or electrical pumps described above, although the invention is not limited in regard to electric power consuming components deployed in the tool 100.

It will be appreciated that steering tool functionality is advantageously enhanced by providing improved data transmission between housing 110 and rotating shaft 115. For example, closed-loop steering techniques such as geo-steering techniques, commonly require communication with LWD sensors deployed elsewhere in the drill string. Typical geo-steering applications make use of directional formation evaluation measurements (azimuthally sensitive LWD measurements) made very low in the BHA, for example, in a rotating stabilizer located just above the drill bit and/or even in the drill bit. To enable true closed-loop control, such directional formation evaluation measurements are advantageously transmitted in substantially real time to electronic module 140. Electronic module 140 is also advantageously disposed in electronic communication with a downhole telemetry system (e.g., a mud pulse telemetry system) for transmitting various steering tool data up-hole. Such telemetry systems are typically deployed at the upper end of the BHA.

Turning now to FIGS. 3A and 3B, one exemplary embodiment of a non-contact, capacitive datalink 200 (FIG. 2) in accordance with the present invention is depicted in longitudinal (FIG. 3A) and transverse (FIG. 3B) cross section. Datalink 200 is disposed to transmit electrical power (energy) and data in either direction across the gap 230 between the housing 110 and shaft 115. In the exemplary embodiment shown, datalink 200 includes first and second thin-walled, cylindrical transceivers 210 and 220 (also referred to herein as antenna plates). Transceiver 210 is deployed on an outer surface of the rotating shaft 115, while transceiver 220 is deployed on an inner surface of the housing 110. Transceivers 210 and 220 may be fabricated from substantially any suitable electrically conductive material, e.g., including conventional steels used to fabricate drill collars. In one exemplary embodiment a gold-plated beryllium copper alloy may be advantageously owing to its high electrical conductivity and corrosion resistance. Transceivers 210 and 220 are insulated from the main body of the shaft 115 and the main body of the tool housing 110, for example, via deployment in insulative housings 215 and 225. Housings 215 and 225 may be fabricated from substantially any suitable insulative material capable of withstanding downhole conditions, for example, including PEEK (polyetheretherketone). As shown on FIGS. 3A and 3B, the insulative housings 215 and 225 are disposed to electrically isolate the transceivers 210 and 220 from the shaft 115 and housing 110. Suitable insulators also advantageously tend to increase the dielectric constant of the gap 230 between the transceivers 210 and 220 (as described in more detail below).

It will be appreciated by those of ordinary skill in the art that downhole tools must typically be designed to withstand shock levels in the range of 1000 G on each axis and vibration levels of 50 G root mean square. Such shock and vibration, typically due to engagement of the drill bit with the formation, is known to cause eccentric rotation and axial translation of the shaft 115 in housing 110. The exemplary embodiment of the inventive capacitive coupling 200 shown on FIGS. 3A and 3B is intended to accommodate expected downhole shock and vibration. In the exemplary embodiment shown, transceiver housings 215 and 225 (and therefore transceivers 210 and 220) are disposed to translate/vibrate together thereby maintaining gap 230 at a substantially constant thickness while simultaneously preventing relative rotation between transceiver housing 225 and tool housing 110.

With continued reference to FIGS. 3A and 3B, one or more bearings 255 may be deployed between transceiver housings 215 and 225. It will be appreciated, that bearings 255 are disposed to maintain a substantially uniform gap 230 thickness during drilling (e.g., during the shocks and vibrations that are commonly encountered during drilling and during rotation of the shaft 115 in the tool housing 110). While roller bearings are depicted in the exemplary embodiment shown, the invention is not limited in this regard. For example, a conventional journal bearing or bushing arrangement may also be utilized (journal bearings are typically preferred since they tend to accommodate a very thin gap 230). Notwithstanding, the invention is also expressly not limited to the deployment of bearings of any kind between transceiver housings 215 and 225. It will be appreciated that in certain embodiments conventional bearing arrangements deployed elsewhere on the tool may provide sufficient axial and lateral support to maintain the gap 230 at an approximately constant thickness (especially if the datalink is implemented in close proximity to the conventional bearing arrangement). The exemplary embodiment shown also includes an anti-rotation tab 245 disposed to prevent relative rotation between the transceiver housing 225 and tool housing 110. Again, the invention is not limited in this regard.

In the exemplary embodiment shown on FIGS. 3A and 3B, spring members 240 may be deployed between transceiver housing 225 and tool housing 110 such that transceiver housing 225 accommodates eccentric rotation of the shaft 115. It will be understood that the invention is not limited to any particular spring configuration or number of spring members. Nor is the invention even limited to the use springs or any other biasing means. In the exemplary embodiment shown, springs 240 are disposed to accommodate lateral motion of the shaft 115 relative to the housing 110. The invention may alternatively and/or additionally include springs disposed to accommodate axial motion of the shaft 115 relative to the housing 110 for shock and vibration absorption.

Figure 4:
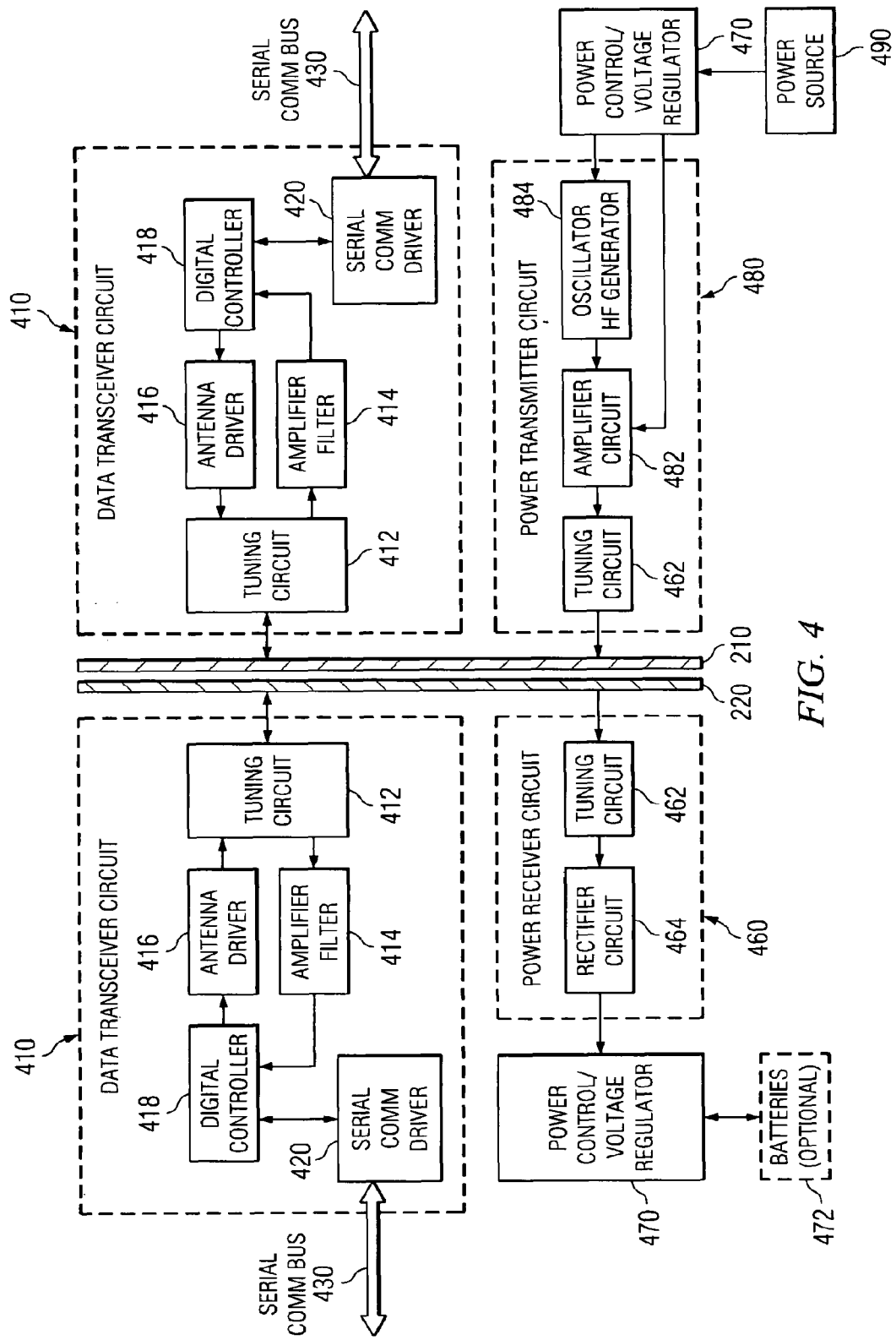
FIG. 4 depicts a block diagram of an exemplary electronic circuit for transmitting data and power across the capacitive coupling depicted in FIGS. 3A and 3B.

Turning now to FIG. 4, a block diagram of exemplary control circuitry utilized for transmitting both electrical power and electronic data between transceivers 210 and 220 is shown. The exemplary embodiment shown enables electronic data transfer in both directions; i.e., from transceiver 210 to transceiver 220 and from transceiver 220 to transceiver 210. The exemplary embodiment shown also enables electrical power transmission from transceiver 210 to transceiver 220 (i.e., from shaft 115 to tool housing 110), although the invention is not limited in this regard. The invention may alternatively be configured to transmit power from transceiver 220 to transceiver 210. Moreover, those of ordinary skill in the art will readily recognize that control circuitry may be configured that enables power transmission in both directions (e.g., at distinct frequencies and/or during distinct time intervals). It will also be appreciated that the invention is not limited to embodiments in which both data and power may be transmitted through the capacitive coupling device 200. Alternative embodiments may readily be configured for exclusive data transmission or exclusive power transmission.

With continued reference to FIG. 4, the exemplary embodiment shown includes first and second data transceiver circuits 410 electronically connected to the corresponding transceivers 210 and 220. The exemplary embodiment of transceiver circuits 410 depicted on FIG. 4 is configured to provide bi-directional communication of conventional serial communication signals at 19,200 bits/sec, with each byte including 11 bits (one start bit, nine data bits, and one stop bit). The invention is, of course, not limited in regard to data communication rates and/or formats. It is expected that communication rates up to (and even exceeding) 1 megabit/sec will be readily achievable using exemplary embodiments of the invention. In the exemplary embodiment shown, data transceiver circuits 410 each include a tuning circuit 412 (e.g., a conventional band pass filter) electronically coupled to transceivers 210 and 220. In one advantageous embodiment, tuning circuit 412 has a pass-band centered at about 1.23 MHz, although the invention is not limited in this regard. Tuning circuit 412 is electronically connected to amplifier filter 414 and antenna driver 416 which are in turn electronically connected to a digital control circuit 418. The digital control circuit 418 is further electronically connected to a serial communication driver and protection circuit 420, which is in turn connected to a communication bus 430 for communicating with other BHA components.

When transmitting data, a data signal is received at the serial communication driver 420 from bus 430. The digital control circuit 418 converts the digital signal to an analog signal which is used to modulate a carrier frequency at the antenna driver 416. It will be understood that substantially any known modulation techniques may be utilized, for example, including amplitude, frequency, and phase modulation. Conventional digital modulation schemes, for example, including QAM, DSL, ADSL, TDMA, FDMA, and the like, may also be utilized. In one advantageous embodiment, a carrier frequency of 1.23 MHz is utilized, although the invention is not limited in this regard. Antenna driver 416 transmits the modulated data signal through the tuning circuit 412 to the corresponding transceiver 210, 220. The data signal is received at the other transceiver 210, 220 and tuning circuit 412 and amplified via amplifier filter 414. The digital control circuit converts the modulated analog signal to a corresponding digital signal (e.g., a 19,200 bit per second, 5 volt signal) which is received by the serial communication driver 420.

As stated above, the exemplary embodiment shown is configured to transmit electrical power from the rotating shaft 115 to the tool housing, i.e., from transceiver 210 to transceiver 220 on FIGS. 3A, 3B, and 4. As also stated above, the invention is not limited in this regard. FIG. 4 shows a power source at 490. Power source 490 may include substantially any suitable downhole power source, e.g., including a battery pack, a mud-driven turbine alternator, and/or a shaft-driven turbine alternator. The power source 490 is electrically connected to a power control circuit 470 (e.g., a voltage regulator) which is in turn connected to a power transmitting circuit 480. The power control circuit is typically further connected to (and provides power to) other electronic and electrical components, for example, including data transceiver circuit 410. The power transmitting circuit includes a high-frequency generator 484 (e.g., 12.3 MHz in one advantageous embodiment) for converting electrical energy from the power controller 470 to high-frequency AC. It will be appreciated that data and power may be advantageously transmitted at mutually distinct frequencies, thereby enabling simultaneous data and power transmission. The oscillator 484 is connected to an amplifier circuit 482 which is electrically connected to transceiver 210.

With continued reference to FIG. 4, transceiver 220 is electrically connected to a power receiver circuit 460, which receives the high-frequency electrical energy. In the exemplary embodiment shown, receiver circuit 460 includes a tuning network (tuned to the same frequency as oscillator 484). A rectifier circuit 464 converts the high frequency power to DC. A low-pass filter and bypass capacitors may be used with the rectifier circuit 464 to generate substantially noise-free DC power. Power controller 470 receives the DC power from circuit 460 and typically provides power to various electrical and electronic components (e.g., including data transceiver circuit 410, solenoid controlled hydraulic valves, latch circuits, and various other electronic circuitry disposed in housing 110). Electrical power received at the controller may also optionally be utilized to charge rechargeable batteries 472.

It will be understood by those of ordinary skill in the art that it is advantageous to minimize the electrical impedance of the capacitive coupling when it is used for power transmission applications (in order to maximize power transmission capability and to minimize losses). The impedance of the coupling may be expressed mathematically, for example, as follows:

$$Z_C = \left| \frac{1}{j\omega C} \right| \quad \text{Equation 1}$$

where $Z_C$ represents the electrical impedance of the capacitive coupling, j represents the imaginary number, $\sqrt{-1}$, C represents the capacitance of the capacitive coupling, and $\omega$ represents the transmitted frequency in radians ($\omega=2\pi f$ where f represents the frequency). Those of ordinary skill will readily recognize that the impedance $Z_C$ is inversely proportional to the transmitted frequency and the capacitance of the coupling. At any given frequency, the impedance is inversely proportional to the capacitance. Thus, for power transmission applications in which a low impedance is desirable, it is typically advantageous to maximize the capacitance of the inventive coupling (e.g., to achieve a capacitance of greater than 100 pF).

The capacitance, C, of the capacitive coupling may be expressed mathematically as follows $$C = \frac{\kappa \varepsilon_0 A}{d} \quad \text{Equation 1}$$

where $\kappa$ represents the dielectric constant of the material in the gap (e.g., gap 230), $\varepsilon_0$ represents the permittivity of free space (which is a constant having the value of approximately $8.55 \times 10^{-12}$ F/m), A represents the area of the transceivers 210, 220 on either side of the gap 230, and d represents the thickness of the gap. Those of ordinary skill will readily recognize that the capacitance C is proportional to $\kappa$ and A, and inversely proportional to d. Thus, for power transmission applications, it may be advantageous to increase the area to thickness ratio (A/d) of the coupling as well as increase the dielectric constant $\kappa$ of the medium in the gap.

In applications in which one transceiver rotates with respect to the other transceiver (e.g., the exemplary embodiment depicted on FIGS. 3A and 3B), the gap is typically filled with a lubricating oil (although the invention is not limited in this regard as the gap may alternatively be evacuated). Suitable lubricating oils typically have a dielectric constant of about 2 (about twice that of free space) at downhole temperatures and pressures. The dielectric constant of the gap may be advantageously increased, for example, by utilizing a high dielectric constant lubricating fluid or by employing high dielectric constant insulators (e.g., insulative housings 215 and 225). PEEK has a dielectric constant of about 3. Other higher dielectric constant materials may be advantageously utilized provided they are capable of withstanding demanding downhole conditions.

The surface area of the transceivers may be increased, for example, by increasing the axial length of the cylinders. For rotary steerable embodiments, transceiver lengths of approximately 3 to 9 inches (resulting in a surface area of approximately 40 to 120 square inches) tend to be advantageous. It will be appreciated that while transceivers in accordance with the invention may occupy a relatively large area (e.g., of the inner surface of housing 110 and the outer surface of shaft 115) they tend to occupy a relative small portion of the tool volume. The thickness of the gap may be advantageously decreased, for example, as described above, via the use of conventional journal bearings. In one exemplary embodiment that may be advantageously utilized for power transmission, the gap between the transceivers has a thickness of less than about 0.1 inches (less than 2.5 mm).

It will be appreciated that data transmission across the capacitive coupling typically requires the transmission of significantly less electrical energy than that of power transmission. For example, data transmission typically only requires an electrical current on the order of a few microamps or less. Useful power transmission, on the other hand, typically involves transferring at least a milliamp of electrical current. Thus it will be appreciated that exemplary embodiments of the invention intended for data transmission only may be configured differently than embodiments that are intended for electrical power transmission. For example, for data transmission only, it is not necessarily advantageous to increase the capacitance of the capacitive coupling. As a result, considerably smaller transceivers may be utilized (e.g., including an insulated wire as apposed to the plates shown on FIGS. 3A and 3B). Moreover, low current data signals may be transmitted across a wider gap between the transceivers. Thus, for data transmission only, there is no need for journal bearings or other mechanical arrangements intended to maintain a thin gap. The first and second transceivers also need not be axially overlapping for data transmission (whereas for power transmission the transceivers typically include a relatively large overlapping area as described above).

It will be appreciated that the use of bearings, springs, and anti-rotation mechanisms (e.g., bearings 225, springs 240, and anti-rotation tab 245 depicted on FIGS. 3A and 3B) is purely optional. In one exemplary embodiment of the invention, the capacitive coupling does not include bearings, springs, or any anti-rotation tab. Such a capacitive coupling has been found to be suitable for high-speed data transmission and low power transmission applications (e.g., powering electronics components). Moreover, the capacitive coupling embodiment is inexpensive to fabricate and has been found to be highly robust and stable, advantageously providing for substantially maintenance free data and low power transmission between shaft 115 and housing 110.

As stated above, the invention is not limited to rotary steerable or even steering tool embodiments. Exemplary embodiments in accordance with the invention may also be utilized, for example, in downhole motors (mud motors). For example, conventional mud motors typically include a bearing housing deployed below the power section, the bearing housing typically including a mandrel deployed to rotate in an outer housing. In one exemplary embodiment of the invention, a first transceiver may be deployed on the outer surface of the mandrel and a second transceiver may be deployed on an inner surface of the housing (similar to the steering tool embodiment depicted on FIGS. 3A and 3B).

Turning now to FIGS. 5 and 6, it will be appreciated that the invention is also not limited to embodiments in which one transceiver is disposed to rotate with respect to the other. FIGS. 5 and 6 depict a threaded downhole tool (pipe) connection including an alternative embodiment of a capacitive coupling 500 in accordance with present invention. Capacitive coupling 500 is similar to coupling 200 described above in that it includes first and second transceivers 510 and 520. In the exemplary embodiment shown, transceiver 510 is deployed in pin end 540 and transceiver 520 is deployed in box end 550. As shown in more detail on FIG. 6, transceivers 210 and 220 are deployed in corresponding insulative housings 515 and 525. Housing 515 is deployed in a slot 542 in an outer surface of the pin end 540 while housing 525 is deployed in a slot 552 in an inner surface of the box end 550. Transceivers 510 and 520 are shown electrically connected to electrical wiring 532 and 534, such as conventional coaxial cable (the invention is not limited to any particular type of wiring). It will be appreciated that the invention is not limited by the location of transceivers 510 and 520. For example, transceivers 510 and 520 may alternatively be located at 535 on FIG. 6.

In the exemplary embodiment shown, transceivers 510 and 520 include thin-walled cylindrical conductors. While the invention is not limited in this regard, cylindrical transceivers advantageously eliminate the need for achieving for particular angular orientation during make up. As such, the connection may be advantageously made up to substantially any desirable torque and/or relative angular orientation. When the threaded connection is made between pin end 540 and box end 550, the transceivers 510 and 520 are brought into close proximity with one another thereby forming the capacitive coupling and enabling data transmission. It will be appreciated that capacitive coupling 500 differs from capacitive coupling 200 in that there is typically no lubricating fluid between the transceivers 510 and 520. During make up of the connection, insulative housings 515 and 525 may be brought into direct contact with one another. Housings 515 and 525 are typically slightly recessed to minimize compressive stresses during make up.

Exemplary embodiments of capacitive coupling 500 are typically suitable for data transmission through a downhole pipe connection and may be advantageously utilized for data communication between various BHA tools (e.g., including MWD, LWD, and steerable tool embodiments). It will be understood that capacitive couplings in accordance with the invention may also be utilized in substantially any downhole connection, for example, those utilized in drill collars, pipes, cross-overs, stabilizers, bent-subs, vertical drilling tools, reamers, near bit stabilizers and drill bits. Exemplary embodiments of the invention may also be utilized in drill string communication systems similar to the IntelliPipe® system, which is available from IntelliServ® (a Grant Prideco Company). Implementation of exemplary capacitive coupling embodiments in accordance with the invention thus advantageously enables substantially real-time, high-speed, two-way communication among a networked surface system (even an office computer) and substantially any downhole tool.

With reference now to FIG. 7, a transverse cross section of a downhole generator (alternator) 700 including a capacitive coupling device in accordance with the invention is depicted. Downhole generator 700 includes a magnetic ring 710 deployed about shaft 115. As shown, magnetic ring 710 includes a plurality of permanent magnets having circumferentially alternating magnetizations. While eight magnets (four N and four S) are employed in the exemplary embodiment depicted, the invention is by no means limited in this regard. Magnetic ring 710 is typically deployed in an insulative housing 715, which is disposed to electrically insulate the magnets from the shaft 115. Downhole generator 700 further includes a magnetic armature 720 having electrically conductive windings deployed in the housing. Armature 720 is typically deployed in an electrically insulative housing 725 disposed to insulate the armature 720 from the housing 110. Those of ordinary skill in the electrical arts will readily recognize that rotation of shaft 115 (including magnetic ring 710) in housing 110 (including the wound armature 720) generates an alternating electric current in the windings. This AC power may be rectified via known means and used to power various components in the housing 110, for example, including electronics, latch circuits, solenoids, electric motors, electric pumps, and the like. The rectified power may also be utilized to recharge a rechargeable battery pack. The invention is not limited in these regards.

Downhole generator 700 further includes a capacitive datalink disposed for transmitting data between the rotating (e.g., shaft 115) and non-rotating (e.g., housing 110) portions of the tool. In the exemplary embodiment shown, magnets 710 and magnetic armature 720 are deployed on either side of a dielectric gap 730 and are configured to function as corresponding first and second transceivers. Although not shown on FIG. 7, magnetic ring 710 and magnetic armature 720 are electrically connected to data transceiver circuits (e.g., circuits 410 shown on FIG. 4) suitable for transmitting and receiving data signals through the capacitive coupling. It will be appreciated that relatively high-frequency electrical signals (e.g., about 1 MHz as described above with respect to FIG. 4) are typically (although not necessarily) employed for data transmission. Such high frequency signals advantageously reduce the impedance of the capacitive coupling and prevent interference with the AC power generated by rotation of the magnetic ring.

The incorporation of a capacitive datalink into downhole generator 700 advantageously conserves valuable tool space while at the same time providing considerable electrical power for electrical components deployed in the housing 110. The same tool space is advantageously utilized both to generate electrical power and transmit high-speed data between the rotating and non-rotating tool components. At a shaft rotation rate of 200 rpm, exemplary embodiments of downhole generator 700 are typically capable of producing a few Watts of electrical power. Such power generation advantageously obviates (or reduces) the need for downhole battery packs. Data may be simultaneously transmitted (while electric power is being generated) back and forth through the generator 700 (across the capacitive datalink). As described above with respect to FIG. 4, data transmission rates on the order of 1 megabit per second are expected to be readily achievable (although the invention is not limited in this regard).

Downhole generator 700 may also be advantageously utilized to measure the rotation rate of shaft 115 relative to the housing 110. It will be appreciated that the electrical power produced by generator 700 has an AC frequency that is proportional to the rotation rate (the proportionality constant depending upon the number of magnets in the magnetic ring 710 and the number of windings in the armature 720). The AC frequency may be determined by any of numerous electrical techniques known to those of ordinary skill in the electrical arts. For example, the analog signal produced by the generator may be converted to a digital signal (e.g., a square wave). A microprocessor may be readily configured to determine the pulse frequency of the digital signal (e.g., via detection of the rising edge of each pulse) and thus the rotation rate of the shaft. The measured rotation rate may be utilized by the processor to program the steering tool, for example, as disclosed in commonly assigned U.S. Pat. No. 7,222,681 and commonly assigned, co-pending U.S. Patent Publication 2005/0269082. Use of the downhole generator 700 to measure the rotation rate of shaft 700 advantageously obviates (or provides redundancy to) other known means, e.g., including Hall-Effect sensors and magnets.

It will be appreciated that downhole generator 700 is not limited to embodiments in which magnetic ring 710 and magnetic armature 720 function as transceivers in a capacitive datalink. In alternative embodiments downhole generator 700 may also include distinct transceivers. For example, magnetic ring 710 may include a thin, conductive, non-magnetic plate deployed on its outer surface (facing the gap 730). Likewise, armature 720 may also include a thin, conductive, non-magnetic plate deployed on its inner surface (facing the gap). These plates, being insulated from the shaft 115 and housing 110 may be electrically connected to data transceiver circuits and utilized to transmit data through generator 700. In another alternative embodiment, the windings deployed the armature 720 may be utilized as a transceiver. In such an embodiment, the magnetic ring 710 (or one of the above described plates) may be capacitively coupled directly to the windings.

It will be appreciated that capacitive data links in accordance with the present invention may be integrated into substantially any suitable downhole tool structure having substantially any particular function unrelated to the datalink (e.g., the downhole generator depicted in FIG. 7). Alternative configurations will be apparent to those of skill in the downhole arts.

Although the present invention and its advantages have been described in detail, it should be understood that various changes, substitutions and alternations can be made herein without departing from the spirit and scope of the invention as defined by the appended claims.

I claim:

1. A downhole assembly comprising:
   first and second downhole members;
   a non-contact, capacitive coupling device including first and second capacitively coupled transceivers and a dielectric gap therebetween, the first transceiver deployed in the first member and the second transceiver deployed in the second member, the first and second transceivers disposed to transfer an electrical signal between the first and second members;
   wherein the first and second transceivers are deployed in corresponding first and second electrically insulative transceiver housings, the first transceiver housing being deployed in the first downhole member and the second transceiver housing being deployed in the second downhole member; and
   wherein a portion of each of the first and second insulative housings form the dielectric gap between the transceivers.

2. The downhole assembly of claim 1, wherein the electrical signal comprises at least one member selected from the group consisting of electrical power and data.

3. The downhole assembly of claim 1, wherein the first and second transceivers comprise first and second co-axial, electrically conductive cylinders.

4. A threaded downhole connector comprising:
   a first threaded member disposed to be threadably connected with a second threaded member;
   a non-contact, capacitive coupling device including first and second capacitively coupled transceivers and a dielectric gap therebetween, the first transceiver deployed in the first threaded member and the second transceiver deployed in the second threaded member, the capacitive coupling device disposed to transfer an electrical signal between the first and second threaded members;
   wherein the first and second transceivers are deployed in corresponding first and second electrically insulative transceiver housings, the first transceiver housing being deployed in the first threaded member and the second transceiver housing being deployed in the second threaded member; and
   wherein a portion of each of the first and second insulative housings form the dielectric gap between the transceivers when the connector is made up.

5. The downhole connector of claim 4, wherein the electrical signal comprises a data signal.

6. The downhole connector of claim 4, wherein the first and second transceivers comprise first and second co-axial, electrically conductive cylinders.

7. The downhole connector of claim 4, wherein the first and second transceivers are electrically insulated from the corresponding first and second threaded members.

8. The downhole connector of claim 4, wherein the first and second insulative housings contact one another when the connector is made up.

9. The downhole connector of claim 4, further comprising first and second electronic transceiver circuits, the first transceiver circuit electrically connected to the first transceiver and the second transceiver circuit electrically connected to the second transceiver, the first and second transceiver circuits disposed to transfer the electrical signal between the transceivers.

10. The downhole connector of claim 9, wherein each of the first and second transceiver circuits comprises a data transceiver circuit, each of the data transceiver circuits disposed to transmit and receive data between the transceivers.

11. A string of downhole tools connected end to end, the string comprising the downhole connector of claim 4 deployed between adjacent ones of the tools, the string further including a plurality of tools being selected from the group consisting of drill collars, pipes, cross-overs, stabilizers, motors, bent-subs, MWD tools, LWD tools, steering tools, rotary steerable tools, vertical drilling tools, reamers, near-bit stabilizers, and drill bits.

12. A downhole tool assembly comprising:
   first and second threaded members configured to be threaded to one another;
   a first substantially cylindrical transceiver deployed in the first threaded member, the first transceiver including a first electrically insulative housing and a first electrically conductive transceiver element deployed therein, the first housing insulating the first transceiver element from the first member;
   a second substantially cylindrical transceiver deployed in the second threaded member, the second transceiver including a second electrically insulative housing and a second electrically conductive transceiver element, the second housing insulating the second transceiver element from the second member; and wherein (i) the first transceiver is substantially coaxial in the second transceiver and (ii) the first and second insulative housings contact one another forming a dielectric gap between the first and second transceiver elements when the first threaded member is threadably connected to the second threaded member.

\* \* \* \* \*